United States Patent
Coskrey, IV (10) Patent No.: US 6,336,171 B1
(45) Date of Patent: Jan. 1, 2002

(54) RESOURCE PROTECTION IN A CLUSTER ENVIRONMENT

(75) Inventor: Ernest C. Coskrey, IV, Columbia, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/220,096

(22) Filed: Dec. 23, 1998

(51) Int. Cl.[7] .................................................. G06F 12/00
(52) U.S. Cl. .................... 711/152; 711/152; 711/163; 707/9; 707/10; 709/226; 709/229
(58) Field of Search .................... 707/9–10; 709/226, 709/229; 711/152, 163

(56) References Cited

U.S. PATENT DOCUMENTS

| | | | |
|---|---|---|---|
| 5,657,445 A | 8/1997 | Pearce | 395/186 |
| 5,659,756 A | 8/1997 | Hefferon et al. | 395/726 |
| 5,687,379 A | 11/1997 | Smith et al. | 395/726 |
| 5,754,821 A | 5/1998 | Cripe et al. | 395/491 |
| 5,893,161 A * | 4/1999 | McGuffey et al. | 711/153 |
| 5,950,203 A * | 9/1999 | Stakuis et al. | 707/10 |
| 5,999,930 A * | 12/1999 | Wolff | 707/8 |
| 6,101,508 A * | 8/2000 | Wolff | 707/218 |

* cited by examiner

*Primary Examiner*—Do Nyun Yoo
*Assistant Examiner*—Mehdi Namazi
(74) *Attorney, Agent, or Firm*—Maginot, Addison & Moore (57) ABSTRACT

A method of protecting volumes of a mass storage device shared by a server cluster includes the step of transferring from (i) a first file system of a first server of the server cluster to (ii) a first filter driver of the first server, a write request packet directed to a first volume of the mass storage device. Another step of the method includes determining at the first filter driver whether the first server has ownership of the first volume. Yet another step of the method includes transferring the write request packet from the first filter driver to a lower level driver for the mass storage device only if the determining step determines that the first server has ownership of the first volume. Apparatus for carrying out the method are also disclosed.

17 Claims, 7 Drawing Sheets

RESOURCE PROTECTION IN A CLUSTER ENVIRONMENT

BACKGROUND OF THE INVENTION

The present invention relates generally to resource allocation, and more particularly to allocating volumes of a mass storage device in a cluster environment.

In broad terms, a server cluster is a group of independent computer systems working together as a single server computer system. Moreover, a client computer system interacts with a server cluster as though the server cluster is a single server.

Server clusters address among other things two primary concerns: availability and scalability. Availability essentially is concerned with the up time of services provided by a server cluster. For example, if the server cluster provides a database service, then availability is concerned with the number of hours a day, week, or year that client computer systems may access and utilize the database service. One manner by which server clusters have improved availability is essentially by monitoring the status of the members (i.e. computer systems) of the sever cluster. If a server cluster determines that a member of the server cluster has failed, then the server cluster may cause the services provided by the failed member to be moved to another member of the server cluster. In this manner, as long as the server cluster has a member to which services may be moved, then the services remain available to client computer systems even though some members of the server cluster have failed.

Scalability on the other hand is concerned with the ability to increase the capabilities of the server cluster as client computer system demand increases. For example, if a server cluster currently provides several services to 10 clients, then scalability is concerned with the ease by which additional services may be added to the server cluster, and/or additional clients may be served by the server cluster. One manner server clusters have improved scalability of servers is by providing an easy mechanism by which additional processing power may be added to the server cluster. In particular, most server clusters today execute clustering software which enables additional computer systems to be added to a server cluster. This clustering software provides an easy mechanism for transferring a portion of the services provided by an overly burdened member to the added computer systems. In this manner, besides increases in performance, the client computer systems are unaware of the changes to the server cluster and need not be reconfigured in order to take advantage of the additional computer system of the server cluster.

Server clusters often include shared resources such as disks. As a result, server clusters need a mechanism to allocate the resources to the various members of the server cluster. One allocation approach referred to as the shared nothing approach allocates each computer system of the server cluster a subset of the shared resources. More particularly, only one computer system of the server cluster may own and access a particular shared resource at a time, although, on a failure, another dynamically determined system may take ownership of the resource. In addition, requests from clients are automatically routed to the computer system of the server cluster that owns the resource.

Data integrity problems have been encountered by a daemon implementation of the shared nothing approach. In the daemon implementation, a separate background service or daemon process is executed on each computer system of the server cluster. The daemon processes coordinate allocation of resources amongst the computer systems and ensure that a resource allocated to a computer system of the server cluster is not accessible to other computer systems of the server cluster. The problem with the daemon implementation is that the daemon process on any one of the computer systems of the server cluster may die (i.e. stop executing) without the corresponding computer system failing. As a result, the computer system corresponding to the dead daemon process may gain access and corrupt data of resources allocated to another computer system of the cluster.

Another problem with the daemon process implementation results from the fact that daemon process functionality is not immediately available. More particular, a finite amount of time exists between when execution of a daemon process starts and the functionality of the daemon process is available. Accordingly, even if execution of the daemon process is started at boot time (i.e. power up), a small window of time exists between power up of the computer system and daemon process functionality. During this window of time, a computer system may access and corrupt data of a shared resource allocated to another computer system.

Therefore, a need exists for a method and apparatus for allocating resources of a server cluster that alleviates the problems incurred by the above daemon process implementation.

SUMMARY OF THE INVENTION

In accordance with one embodiment of the present invention, there is provided a method of protecting volumes of a mass storage device shared by a server cluster. One step of the method includes the step of transferring from (i) a first file system of a first server of the server cluster to (ii) a first filter driver of the first server, a write request packet directed to a first volume of the mass storage device. Another step of the method includes determining at the first filter driver whether the first server has ownership of the first volume. Yet another step of the method includes transferring the write request packet from the first filter driver to a lower level driver for the mass storage device only if the determining step determines that the first server has ownership of the first volume.

Pursuant to another embodiment of the present invention, there is provided a filter driver for protecting volumes of a mass storage device shared by a server cluster. The filter driver includes instructions which when executed by a first server of the server cluster causes the first server to process a write request packet (i) directed to a first volume of the mass storage device, and (ii) received from a first file system of the first server. The instructions of the filter driver when executed by the first server further cause the first server to determine in response to processing the write request packet whether the first server has ownership of the first volume. Moreover, the instructions of the filter driver when executed by the first server further cause the first server to transfer the write request packet to a lower level driver for the mass storage device only if the first server determines that the first server has ownership of the first volume.

Pursuant to yet another embodiment of the present invention, there is provided a server cluster that includes a mass storage device having a plurality of volumes, a first server coupled to the mass storage device, and a second server coupled to the mass storage device. The first server includes a first file system, a first filter driver, and at least one first lower level driver for the mass storage device. The first filter driver is operable to process a first write request packet received from the first file system that is directed to a first volume of the plurality of volumes. The first filter driver is also operable to determine in response to processing the first write request packet whether the first server has ownership of the first volume. Moreover, the first filter driver is operable to transfer the first write request packet to the at least one lower level driver only if the first server has ownership of the first volume.

The second server includes a second file system, a second filter driver, and at least one second lower level driver for the mass storage device. The second filter driver is operable to process a second write request packet received from the second file system that is directed to the first volume of the plurality of volumes. The second filter driver is also operable to determine in response to processing the second write request packet whether the second server has ownership of the second volume. Furthermore, the second filter driver is operable to transfer the second write request packet to the at least one second lower level driver only if the second server has ownership of the first volume.

It is an object of the present invention to provide a new method and apparatus for protecting volumes of a disk in a server cluster environment.

It is an object of the present invention to provide an improved method and apparatus for protecting volumes of a disk in a server cluster environment.

It is yet another object of the present invention to provide a method and apparatus which maintain integrity of data stored on a storage device shared by servers of a server cluster.

It is still another object of the present invention to provide a method and apparatus which maintains data integrity of a shared storage device during the boot up process of the servers of a server cluster.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
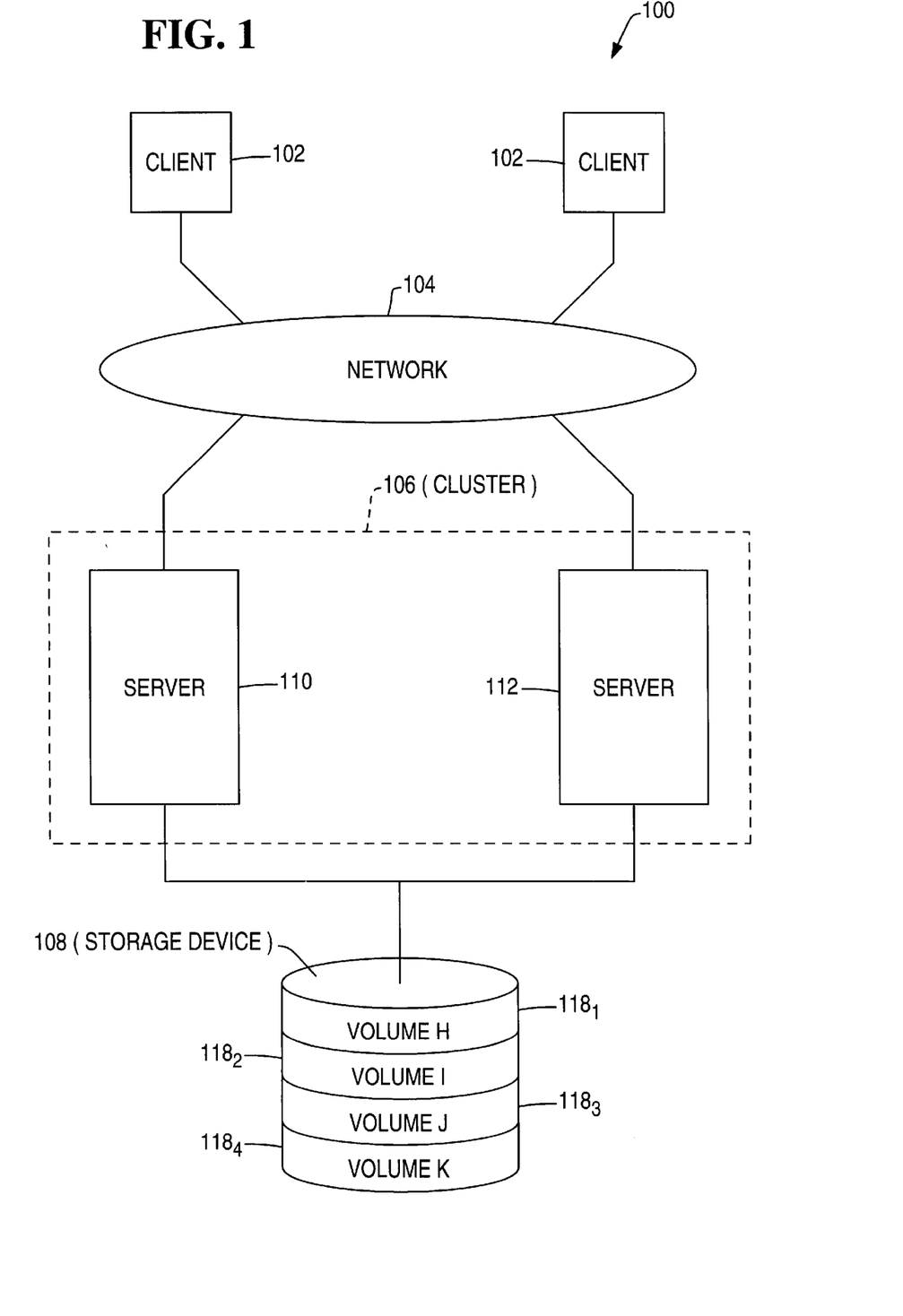
FIG. 1 shows a block diagram of a server cluster environment in which features of the present invention may be incorporated.

FIG. 1 illustrates a system 100 in which various features of the present invention may be incorporated. In particular, the system 100 includes client computer systems 102, a network 104, a server cluster 106, and a shared mass storage device 108 such as a hard disk or a RAID device. The client computer systems 102 are operable to communicate with the server cluster 106 via the network 104, and access services provided by the server cluster 106. To this end, the client computer systems 102 each include conventional computer hardware (e.g. a processor, memory, mouse, keyboard) that in combination execute client software (e.g. e-mail clients, web browsers, file managers) that provide an interface to the services of the server cluster 106.

The network 104 is operable to provide a communications link between the client computer systems 102 and the server cluster 106. The network 104, in a preferred embodiment is also operable to provide a communications link between the server computer systems 110, 112 of the server cluster 106. The network 104 may be implemented with various medium (e.g. wireless, coaxial cable, twisted wire pairs, fibre optical cables, switches, routers) and networking protocols (e.g. Ethernet, NETBUI, TCP/IP, ATM).

The mass storage device 108 is coupled to the server cluster 106 in order to provide the server cluster 106 with a shared data storage for use in providing services to the client computer 102. As illustrated, the mass storage device 108 includes a hard disk partitioned into disk partitions $118_1$, $118_2$, $118_3$, and $118_4$. However, it should be appreciated that the mass storage device 108 may be implemented with other storage devices such as RAM disk drives, writable CD-ROM drives, RAID devices, and digital audio tape (DAT) drives.

The server cluster 106 includes at least two servers 110, 112 in order to provide highly available services to the client computer systems 102. The first server 110 and the second server 112 are coupled to the mass storage device 108 in order to access data needed for providing the services to the client computer systems 102 with data need for the services. Moreover, the first server 110 and the second server 112 are coupled to the network 104 in order to (i) communicate with one another, and (ii) provide services to the client computer systems 102. For example, the first server 110 and the second server 112 may provide any number of services such as printer services, application server services, file server services, database services, e-mail services, proxy services, web server services, name resolution services (e.g. DNS, WINS), ftp services, news services, gateway services, and telnet services to name a few.

In a preferred embodiment, the first server 110 and the second server 112 are each implemented with conventional hardware such as processors, disk drives, network cards, and disk controllers. Moreover, the first server 110 and the second server system 112 each execute clustering software and an operating system such as Windows NT in order to provide services to the client computer system 102. It should be appreciated that the server cluster 106 is merely exemplary and may include more than two servers 110, 112.

The clustering software, in general, configures the first server 110 and the second server 112 to function as a single server from the point of view of the client computer systems 102. To this end, the clustering software is operable to provide a system administrator with an interface for defining services executed by the servers 110, 112 of the server cluster 106. More particularly, the clustering software allows a system administrator to designate which services are executed on which servers 110, 112 of the server cluster 106, the resources required for each provided service, and actions to take in case one of the servers 110, 112 of the server cluster 106 fails. Moreover, the clustering software is operable to cause the servers 110, 112 of the server cluster 106 to provide the services in the manner designated by the system administrator, and carry out the designated actions in case one of the servers 110, 112 fails.

In general, the operating system executed by the first server 110 provides routines and drivers which allow the services and applications of the first server 110 to access resources of the first server 110 and the mass storage device 108. Similarly, the operating system executed by the second server 112 provides routines and drivers which allow the services and applications of the second server 112 to access the resources of the second server 112 and the mass storage device 108.

Figure 2:
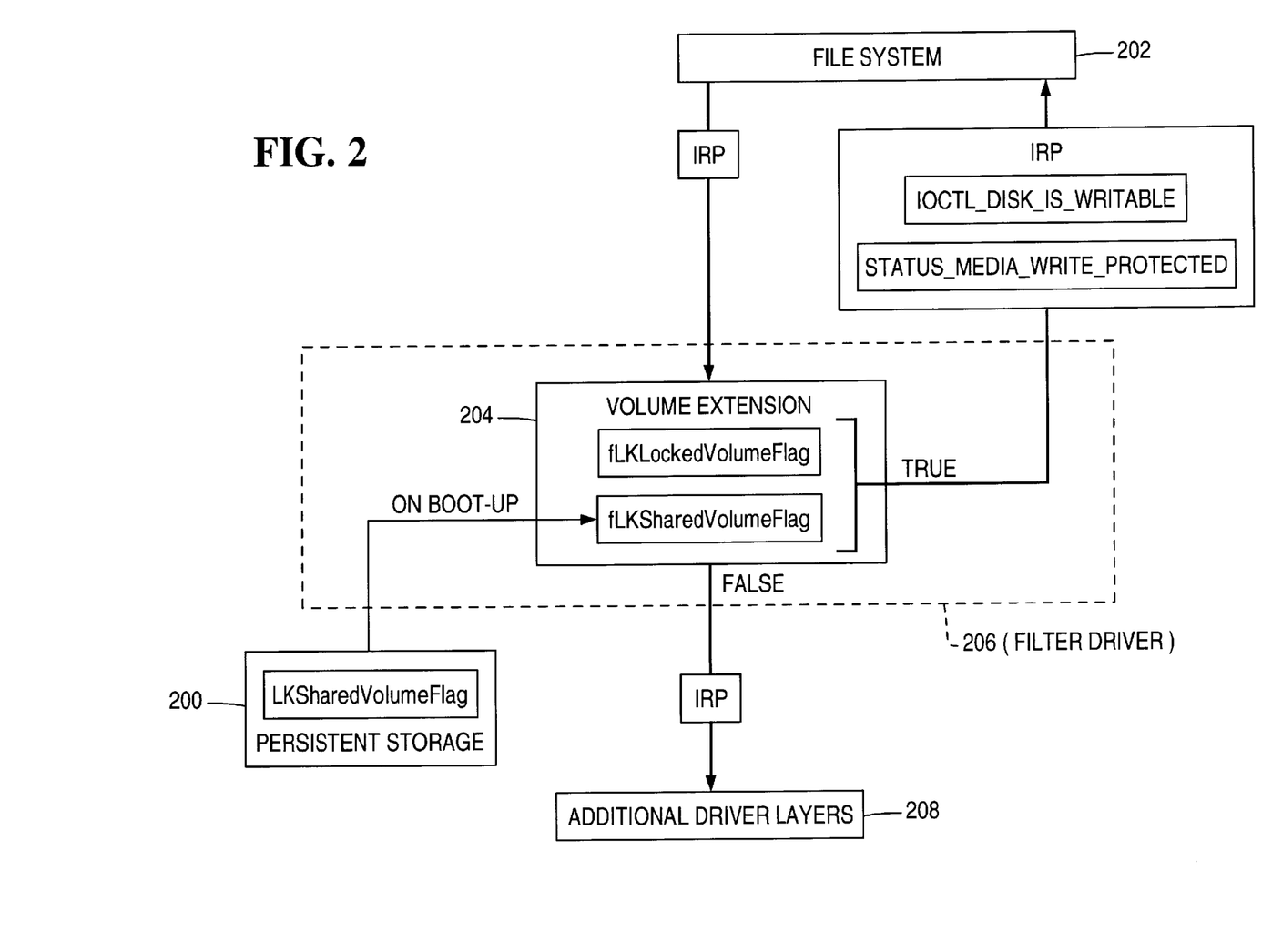
FIG. 2 illustrates layers of an operating system executed by the server cluster shown in FIG. 1.

More specifically, as illustrated in FIG. 2, the operating system in a preferred embodiment includes a persistent storage mechanism 200, a file system layer 202, a volume extension layer 204, a filter driver layer 206, and additional driver layers 208. In order to simplify the following description, the operating system will be described in reference to the first server 110. However, it should be noted that the second server 112 includes similar components.

The persistent storage mechanism 200 is operable to store information in a persistent or non-volatile manner. In other words, information stored in the persistent storage mechanism 200 before a power failure may be retrieved after power is restored to the server. In a preferred embodiment, the persistent storage mechanism 200 is implemented by a registry database supplied by the Windows NT 4.0 operating system. The registry database provides a mechanism by which applications and services may store and retrieve configuration information. In this embodiment, the registry database essentially creates a structured file which is stored on non-volatile memory device such as a hard disk drive. Applications and services may interface with the registry database in order to store information into this structured file and later retrieve information from this structured file. It should be appreciated that many alternative implementations for the persistent storage mechanism 200 exists. For example, the persistent storage mechanism 200 may include initialization files, initialization scripts, and other data structures which are stored on non-volatile storage devices such as floppy disks, hard disks, PROMs, EEPROMs, battery backed memory, and flash memory.

The file system layer 202 of the operating system is operable to generate I/O request packets (IRPs) based upon file system calls made by applications and services executing on the first server 110. In particular, applications may generate file system calls to open a file, read from a file, or write to a file. In response to these file system calls, the file system layer 200 generates IRPs that indicate the type of action requested by the application.

The volume extension layer 204 of the operating system is operable to store information about each volume of the first server 110. In a preferred embodiment, the operating system assigns a volume letter to each partition attached to the first server 110. More specifically, the operating system assigns a volume letter to each partition of a storage device (e.g. floppy disk, RAM disk, hard disk, tape drive) identified by the operating system. For example, as illustrated in FIG. 1, the operating system has respectively assigned the partitions $118_1$, $118_2$, $118_3$, and $118_4$ the volume letters H, I, J, and K.

The filter driver layer 206 of the operating system in general is operable to filter out IRPs directed to shared resources that have not been allocated to the first server 110. More specifically, the filter driver layer 206 is operable to receive from the file system layer 202 an IRP directed to a volume attached to the first server 110, determine from information stored in the volume extension layer 204 whether the volume is locked from the first server 110, and transfer the IRP to the additional driver layers 208 for the volume if the volume is not locked from the first server 110.

Moreover, the filter driver layer 206 is operable to lock, unlock, protect, and unprotect volumes of the first server 110 in response to IRPs that may include one of the following custom I/O control words: an IOCTL_DISK_LFK_LOCK_VOLUME control word, an IOCTL_DISK_LFK_UNLOCK_VOLUME control word, an IOCTL_DISK_LFK_SHARE_VOLUME control word, and an IOCTL_DISK_LFK_UNSHARE_VOLUME control word,. In a preferred embodiment, the IOCTL_DISK_LFK_LOCK_VOLUME control word is defined using the system wide CTL_CODE ( ) macro of the Microsoft Win32 API as follows:

define IOCTL_DISK_LFK_LOCK_VOLUME \
   CTL_CODE(FILE_DEVICE_DISK, 0xBD0,
     METHOD_BUFFERED, \
     FILE_ANY_ACCESSS )

Similarly in a preferred embodiment, the IOCTL_DISK_LFK_LOCK_VOLUME control word, the IOCTL_DISK_LFK_SHARE_VOLUME control word, and the IOCTL_DISK_LFK_UNSHARE_VOLUME control word are defined with the CTL_CODE ( ) macro as follows:

define IOCTL_DISK_LFK_LOCK_VOLUME \
   CTL_CODE(FILE_DEVICE_DISK, 0xBD1,
     METHOD_BUFFERED, \
     FILE_ANY_ACCESSS )
define IOCTL_DISK_LFK_SHARE_VOLUME \
   CTL_CODE(FILE_DEVICE_DISK, 0xBD2,
     METHOD_BUFFERED, \
     FILE_ANY_ACCESSS )
define IOCTL_DISK_LFK_UNSHARE_VOLUME \
   CTL_CODE(FILE_DEVICE_DISK, 0xBD3,
     METHOD_BUFFERED, \
     FILE_ANY_ACCESSS )

As will be explained in detail in reference to FIG. 3, the filter driver layer 206 is operable to cause a volume of the first server 110 to be placed under protection of the clustering software in response to receiving an IRP that includes the IOCTL_DISK_LFK_SHARE_VOLUME control word. Conversely, the filter driver layer 206 is operable to cause a volume of the first server 110 to be removed from clustering software protection in response to receiving an IRP that includes the IOCTL_DISK_LFK_UNSHARE_VOLUME control word. (See, FIG. 4).

Figure 6:
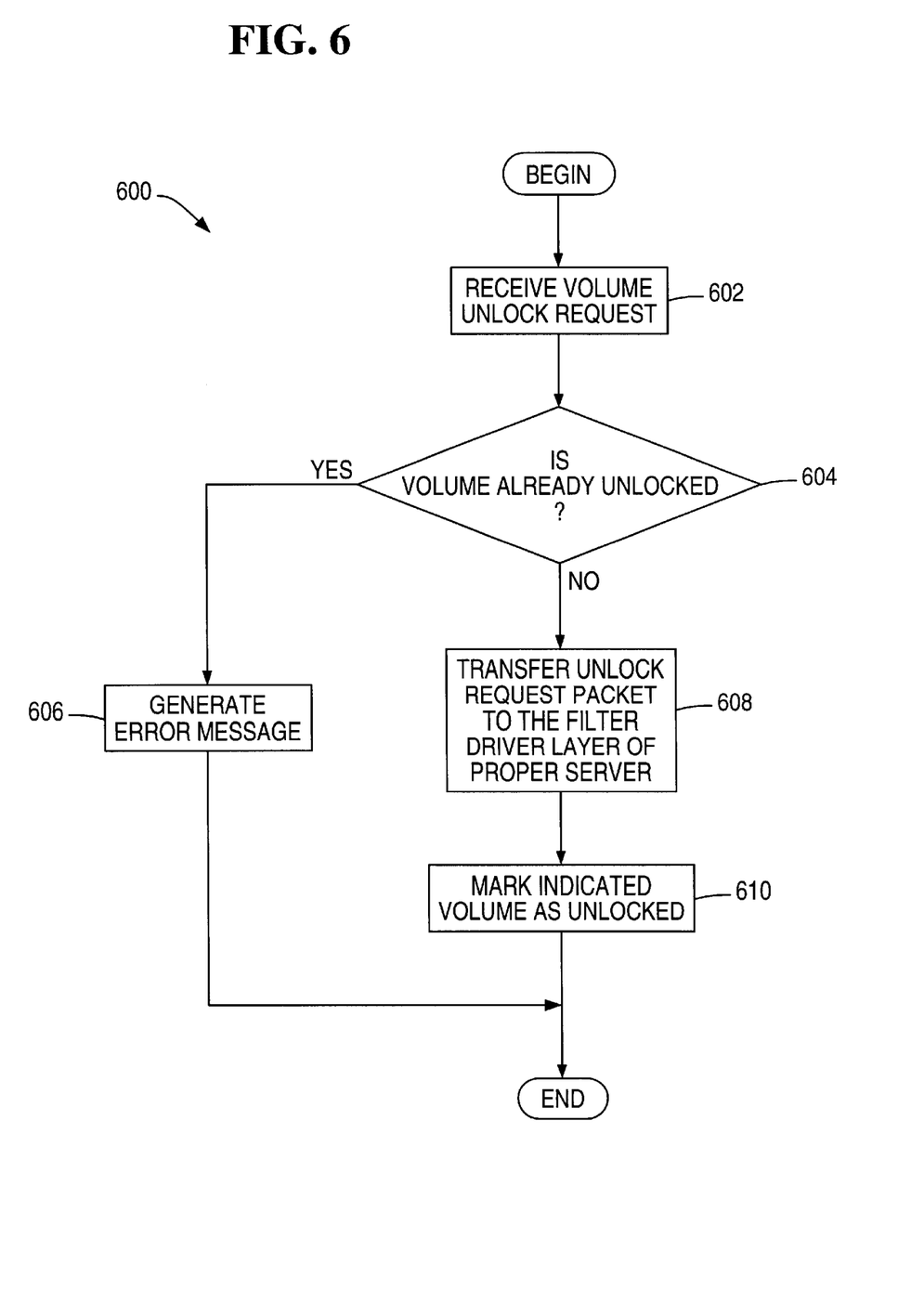
FIG. 6 illustrates a flowchart of a volume unlocking procedure executing by the server cluster of FIG. 1.
Figure 7:
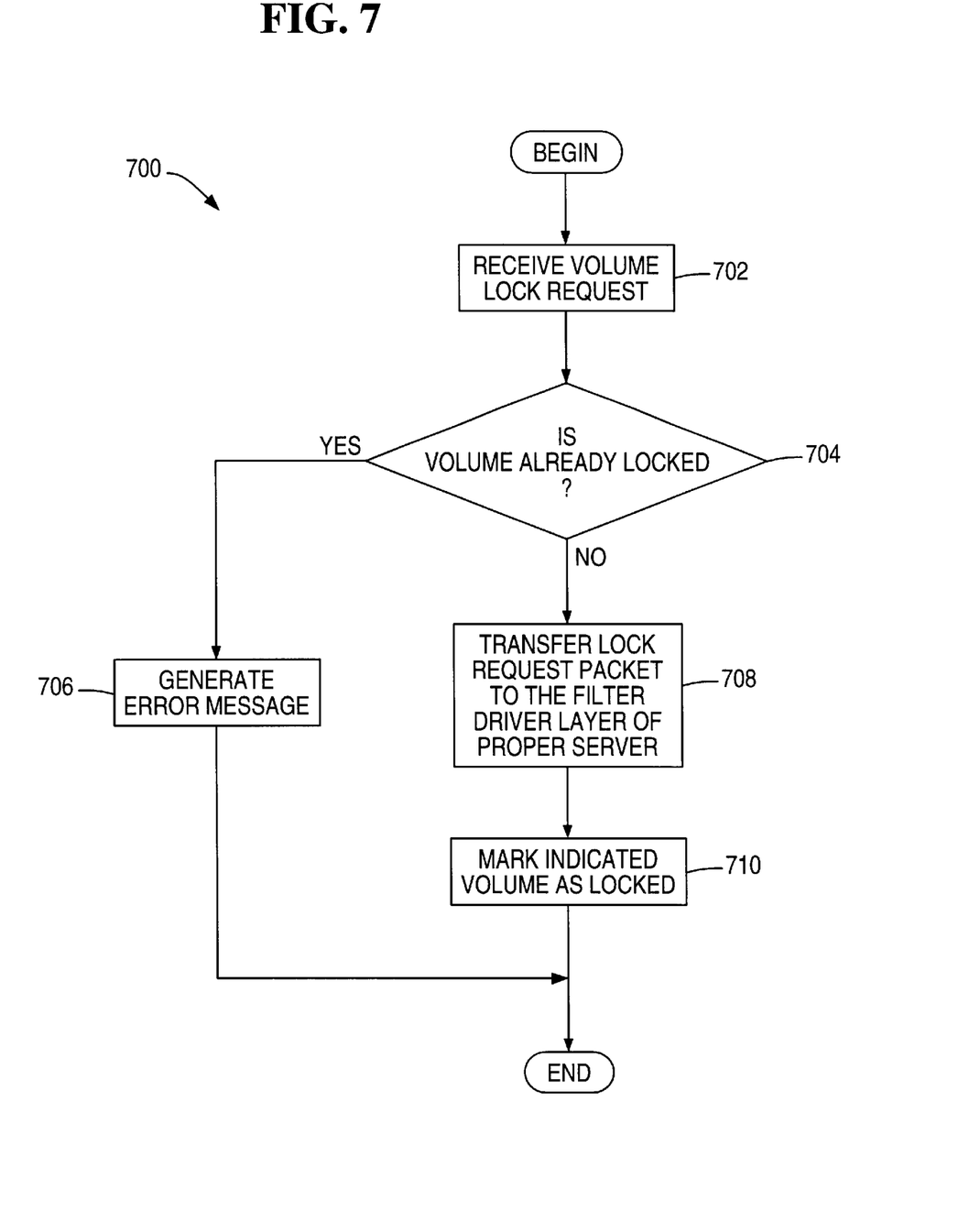
FIG. 7 illustrates a flowchart of a volume locking procedure executing by the server cluster of FIG. 1.

Moreover, as will be explained in detail in reference to FIG. 7, the filter driver layer 206 is operable to cause a protected volume to be locked from the first server 110 in response to receiving an IRP that includes the IOCTL_DISK_LFK_LOCK_VOLUME control word. In other words, in response to receiving a lock IRP for a volume, the filter driver layer 206 is operable to filter out future IRPs to the volume thereby denying the first server 110 ownership of the volume. Conversely, as described in detail in conjunction with FIG. 6, the filter driver layer 206 is operable to cause a protected volume to be unlocked. More specifically, in response to receiving an unlock IRP for a protected volume, the filter driver layer 206 is operable to allow further IRPs for the protected volume to pass through to the additional driver layers 208 for the device on which the volume resides. As a result of allowing the IRPs to pass through, the first server 110 may gain access to the protected volume in order to retrieve data from the protected volume and/or write data to the protected volume.

The additional driver layers 208 of the operating system in general are operable to receive IRPs and execute the IRPs. For example, if the mass storage device 108 is a SCSI device, then the additional driver layers 208 may include a device driver for a SCSI adapter of the first server 110. The device driver for the SCSI adapter generally is operable to process IRPs received from the filter driver layer 206, and configure the SCSI adapter to transfer a SCSI common descriptor block (CDB) to the mass storage device 108 that will cause the mass storage device 108 to fulfill the I/O request indicated by the IRP.

Boot-Up Protection and General Operation of Filter Driver Layer

Figure 3:
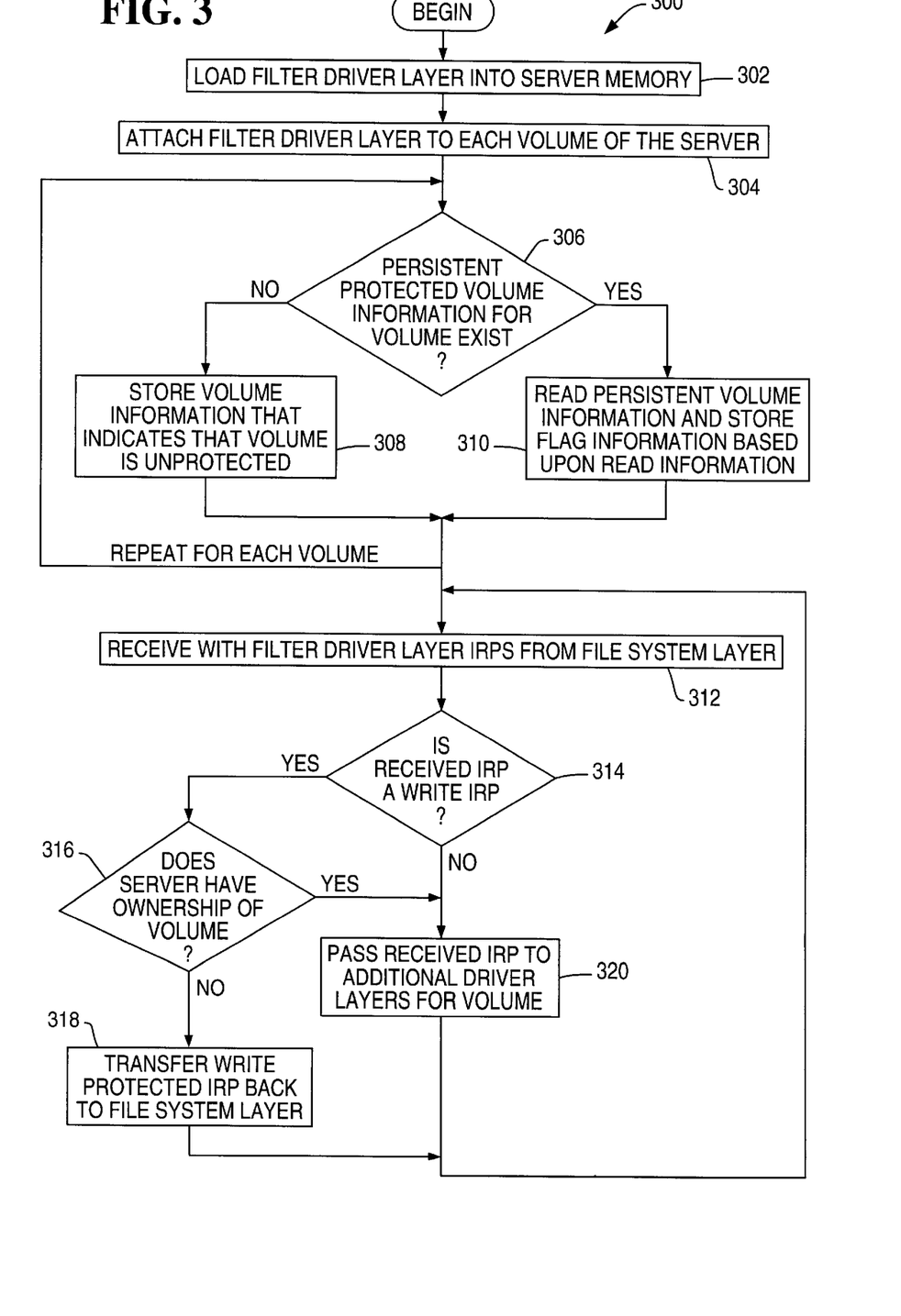
FIG. 3 illustrates a flowchart of the general operation of the filter driver layer of the operating system shown in FIG. 2.

FIG. 3 illustrates a flowchart of the operation of the filter driver layer 206 of the first server 110 of the server cluster. Each server of the server cluster 106 includes a filter driver layer 206. In order to simplify the following description, only the operation of the filter driver layer 206 of the first server 110 will be described in detail since the filter driver layers 206 of the other servers of the server cluster 106 operate in a similar fashion.

Referring back to FIG. 1, whenever the first server 110 is booted up (i.e. when the first server 110 is powered on), the filter driver layer 206 is loaded into memory of the first server 110 in step 302. Upon being loaded into memory, the filter driver layer 206 in step 304 attaches to each volume designated by the operating system of the first server 110. In particular, the filter driver layer 206 attaches to each volume of the partitions $118_1$, $118_2$, $118_3$, and $118_4$ of the shared mass storage device 108. Moreover, the filter driver layer 206 attaches to each volume designated to non-shared storage devices of the first server 110 such as floppy drives, CD-ROM drives, hard drives, and tape drives (not shown).

During the process of attaching to each volume of the first server 110, the filter driver layer 206 in step 306 determines whether the volume has protected volume information stored in the persistent storage mechanism 200. If the filter driver layer 206 determines that the volume has protected volume information stored in the persistent storage mechanism 200, then the filter driver layer proceeds to step 310 in order to obtain the protected volume information for the volume from the persistent storage mechanism 200. However, if the filter driver layer 206 determines that the volume does not have protected volume information stored in the persistent storage mechanism 200, then the filter driver layer 206 proceeds to step 308 in order to store protected volume information for the volume in the persistent storage mechanism 200.

In step 308, the filter driver layer 206 stores in the persistent storage mechanism 200 protected volume information for the volume that indicates that the volume is not protected by the clustering software. Moreover, the filter driver layer 206 stores in the volume extension layer 204 a protect volume flag (i.e. fLKSharedVolumeFlag) for the volume that indicates that the volume is not protected by the clustering software. It should be appreciated that the filter driver layer 206 essentially only needs to create new protected volume information for a volume when a new volume is added to the first server 110. For example, a system administrator may shutdown the first server 110 in order to add a hard disk drive to the first server 110. One result of adding the hard disk drive to the first server 110 is that the first server 110 includes at least one more volume at boot up. Accordingly, when the first server 110 is powered up, the filter driver layer 206 in step 308 stores protected volume information in the persistent storage mechanism 200 and a protect volume flag in the volume extension layer 204 that both indicate that the new volume is not protected by the clustering software.

In a preferred embodiment which utilizes the registry database provided by the Windows NT 4.0 operating, the filter driver layer 206 creates for each disk of the first server 110 a separate HKEY_LOCAL_
MACHINE\SYSTEM\CurrentControlSet\Services\
NCR_LFK\Parameters\Disks\<DiskSignature#> subkey that each identifies a disk of the first server 110. Moreover, the filter driver layer 206 creates under each <DiskSignature#> subkey a <PartitionOffset#> subkey that each identifies a partition of the corresponding disk. Finally, the filter driver layer 206 stores a protect volume flag under each <PartitionOffset#> subkey that indicates that the corresponding volume is not protected by the clustering software. In a preferred embodiment, the filter driver layer 206 set a protect volume flag LKSharedVolumeFlag equal to 0 in order to indicate that the corresponding volume is not protected by the clustering software.

In step 310, the filter driver layer 206 (i) reads the volume protection information from the persistent storage mechanism 200, and (ii) stores a protect volume flag (e.g. fLKSharedVolumeFlag) and a lock volume flag (e.g. fLKLockedVolumeFlag) for the volume in the volume extension layer 204. In particular, if the volume protection information indicates that the corresponding volume is protected by the clustering software, then the filter driver layer 206 stores for the volume (i) a protect volume flag that indicates that the volume is protected, and (ii) a lock volume flag that indicates that the volume is locked. Conversely, if the volume protection information indicates that the corresponding volume is not protected by the clustering software, then the filter driver layer 206 stores for the volume (i) a protect volume flag that indicates that the volume is unprotected, and (ii) a lock volume flag that indicates that the volume is unlocked.

As a result of the above setting of flags, the filter driver layer 206 defaults to providing the first server 110 with full access to any volume which has net been placed under the protection of the clustering software. Moreover, the filter driver layer 206 defaults to locking the first server 110 from any volume which has been placed under the protection of the clustering software. Since at boot up the filter driver layer 206 locks each protected volume from the first server 110, a protected volume must be explicitly unlocked in order to provide the first server 110 with ownership of the protected volume. Accordingly, the filter driver layer 206 ensures that the first server 110 may not inadvertently write data to a protected volume and thereby corrupt the data of the volume.

In a preferred embodiment, the filter driver layer 206 obtains from the registry database the value for the persistent protect volume flag LKSharedVolumeFlag for the volume and sets the protect volume flag fLKSharedVolumeFlag in the volume extension layer 204 to the obtained value. Accordingly, in this preferred embodiment, the filter driver layer 206 stores a protect volume flag fLKSharedVolumeFlag having (i) a value of 0 if the corresponding volume is unprotected, and (ii) a value of 1 if the corresponding volume is protected. Moreover, in a preferred embodiment, the filter driver layer 206 stores for the volume a lock volume flag fLKLockedVolumeFlag having (i) a value of 0 if the corresponding volume is unlocked, and (ii) a value of 1 if the corresponding volume is locked.

After reading/creating volume protection information for each volume of the first server 110 and storing a protect volume flag for each volume in the volume extension layer 204, the filter driver layer 206 is ready in step 312 to receive and process IRPs from the file system layer 202. In general, the filter driver layer 206 may receive in step 312 write IRPs, non-write IRPs, and custom control IRPs which control volume protection provided by the filter driver layer 206. Processing of the custom control IRPs will be discussed in conjunction with FIG. 4, FIG. 5, FIG. 6, and FIG. 7.

In step 314, the filter driver layer 206 determines whether the received IRP indicates that data is to be written to a corresponding volume of the first server 110. In particular, the filter driver layer 206 in a preferred embodiment determines whether the IRP includes an IOCTL_DISK_IS_WRITABLE control word. If the filter driver layer 206 determines that the IRP is a write IRP, then the filter driver layer 206 proceeds to step 316; otherwise, the filter driver layer 206 proceeds to step 320.

In step 316, the filter driver layer 206 determines whether the first server 110 has ownership of the volume indicated by the IRP. To this end, the filter driver layer 206 obtains the protect volume flag and lock volume flag for the volume from the volume extension layer 204. If the protect volume flag indicates that the volume is protected and the lock volume flag indicates that the volume is locked, then the filter driver layer 206 determines that the first server 110 does not have ownership of the volume and proceed to step 318. Otherwise, the filter driver layer 206 determines that the first server 110 does have ownership of the volume and proceeds to step 320.

As a result of the first server 110 not having ownership of the volume, the filter driver layer 206 in step 318 does not transfer the IRP to the additional driver layers 208 for the volume. Instead, the filter driver layer 206 in step 320 transfers a write protected IRP generated from the received write IRP back to the file system layer 202. The write protected IRP in a preferred embodiment includes a STATUS_MEDIA_WRITE_PROTECTED control word that indicates that the volume is write protected and that the corresponding IRP did not affect the contents of the volume. After transferring the write protected IRP to the file system layer 202, the filter driver layer 202 returns to step 312 in order to process the next IRP received from the file system 202.

If the IRP is a non-write IRP or the first server 110 has ownership of the volume, then filter driver layer 206 in step 320 transfers the IRP to the additional driver layers 208 for the volume. As a result of transferring the IRP to the additional driver layers 208, the additional driver layers 208 may process the IRP and properly configure the device interface for the volume in order to carry out the action indicated by the IRP. After passing the IRP through to the additional driver layers 208 for the volume, the filter driver layer 202 returns to step 312 in order to process the next IRP received from the file system 202.

Placing Volume Under Protection

Figure 4:
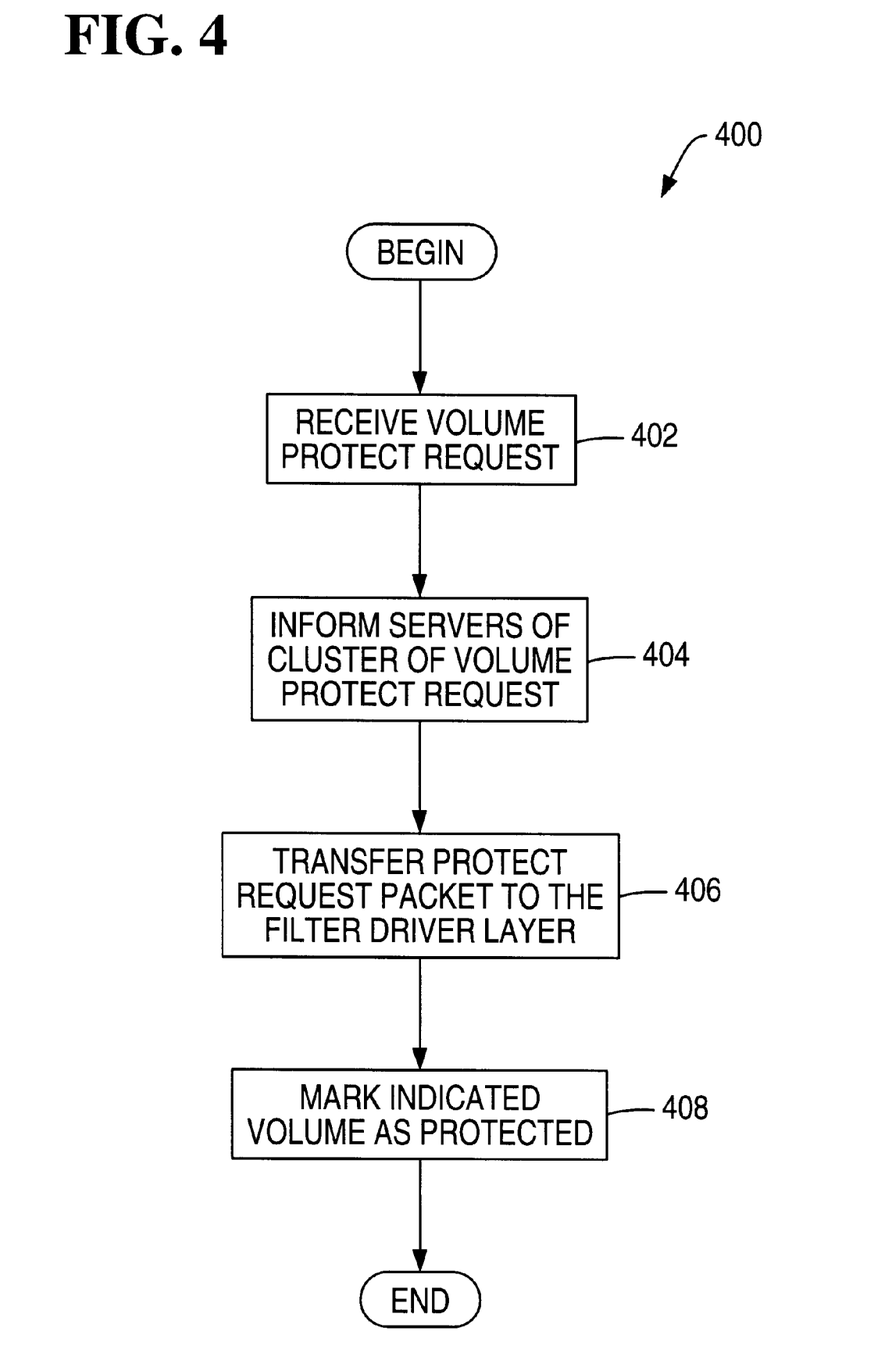
FIG. 4 illustrates a flowchart of a volume protection procedure executing by the server cluster of FIG. 1.

The FIG. 4 illustrates a flowchart of a volume protection procedure 400 executed by the servers 110, 112 of the server cluster 106. Essentially, the volume protection procedure 400 is used by the servers 110, 112 of the server cluster 106 in order to place a volume under the protection of the clustering software.

The volume protection procedure begins in step 402 with the clustering software receiving a volume protection request directed to a volume such as volume J. For example, a system administrator may generate a volume protection request to bring via a user interface of the first server 110 of the server cluster 106.

In response to receiving the volume protection request, the clustering software of the first server 110 in step 404 informs the clustering software of each of the other servers (e.g. second server 112) of the server cluster 106 which volume (e.g. volume J) is to be protected. For example, the clustering software of the first server 110 may transfer a message to the clustering software of the second server 112 via the network 104 that indicates that the volume J is to be protected.

In step 406, the servers 110, 112 of the server cluster 106 each transfer to their respective filter driver layers 206, a protect request packet that is directed to the volume to be protected. More specifically, the clustering software of the first server 110 in a preferred embodiment opens the desired volume (e.g. volume J) by calling the CreateFile ( ) function of the Microsoft Win32 API with the path to the desired volume (e.g. VolumeHandle=CreateFile ("\\.\J:", . . . ) ). As a result of calling the CreateFile ( ) function, the clustering software of the first server 110 obtains a handle to the volume desired to be protected. The clustering software then causes a custom protect control word (i.e. the IOCTL_DISK_LFK_SHARE_VOLUME control word) to be sent to the volume by calling the DeviceIoControl ( ) function of the Win32 API with the handle to the volume as follows:

DeviceIoControl(VolumeHandle, IOCTL_DISK_LFK_SHARE_VOLUME, . . . ) As a result of calling the DeviceIoControl ( ) function with the above parameters, the file system layer 202 of the operating system generates and transfers a volume protect IRP to the filter driver layer 206. In particular, the file system layer 202 in a preferred embodiment (i) creates an IRP that includes the custom I/O control word IOCTL_DISK_LFK_SHARE_VOLUME, and (ii) transfers the created IRP to the filter driver layer 206.

The filter driver layer 206 in step 408 receives and processes the volume protect IRP. To this end, the filter driver layer 206 determines whether the received IRP is a volume protect IRP. In a preferred embodiment, the filter driver layer 206 determines that the received IRP is a volume protect if the received IRP includes the custom IOCTL_DISK_LFK_SHARE_VOLUME control word. If the IRP is a volume protect IRP, then the filter driver layer 206 determines from the volume protect IRP which volume is to be protected and stores values in the persistent storage mechanism 200 and the volume extension layer 204 that indicate that the volume is protected. More specifically, the filter driver layer 206 in a preferred embodiment marks the volume as protected by (i) storing in a registry database used to implement the persistent storage mechanism 200, a persistent volume protection flag LKSharedVolumeFlag for the volume having a value of 1, and (ii) storing in volume extension layer 204 a volume protection flag fLKSharedVolumeFlag for the volume having a value of 1.

It should be appreciated that as a result of storing the persistent volume protection flag in the persistent storage mechanism, that the filter driver layer 206 will automatically lock the associated volume from the first server 110 upon the first server 110 being power-up. (See description of FIG. 3.)

Unprotecting a Volume

Figure 5:
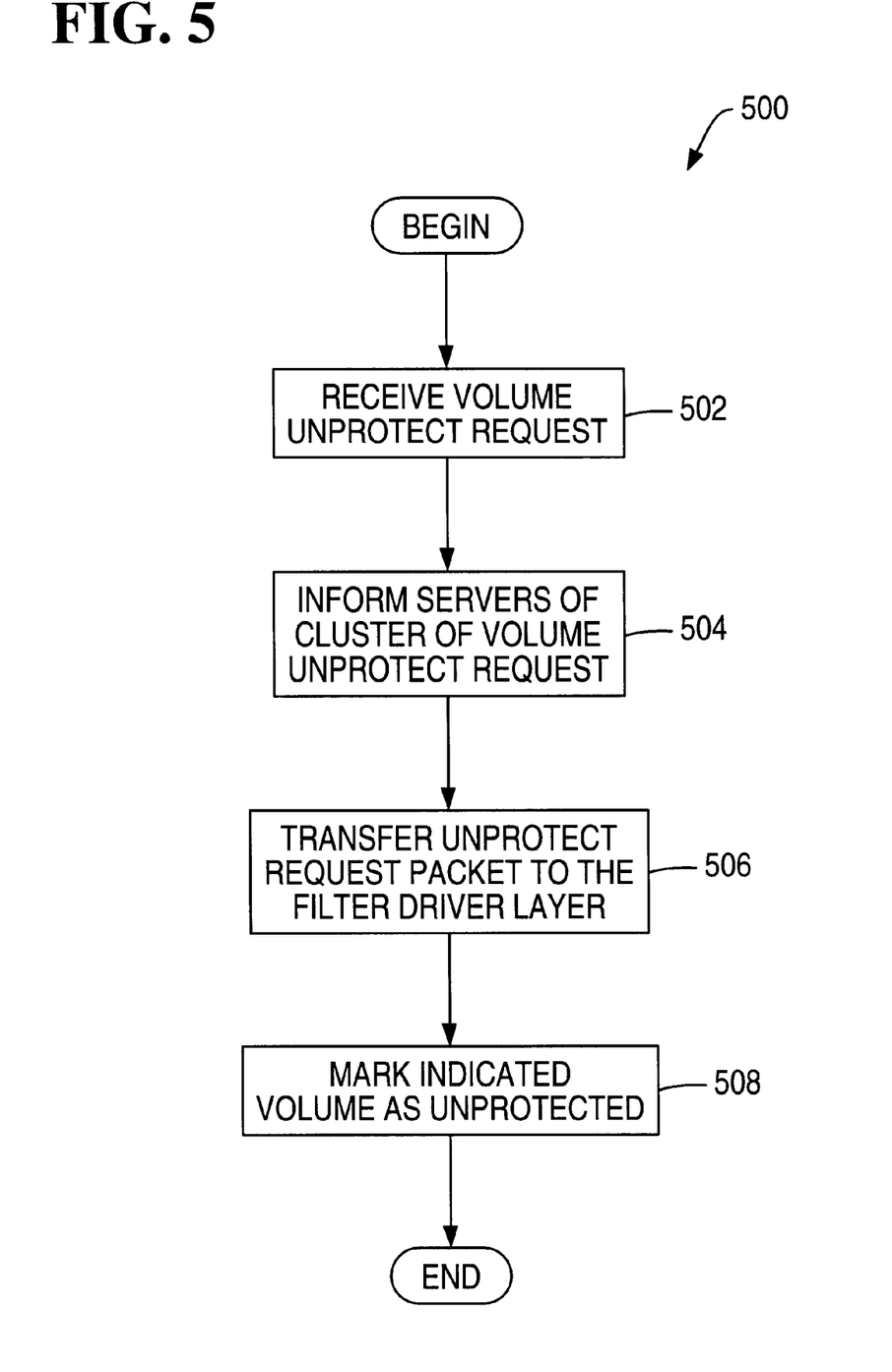
FIG. 5 illustrates a flowchart of a volume unprotection procedure executing by the server cluster of FIG. 1.

The FIG. 5 illustrates a flowchart of a volume unprotection procedure 500 executed by the servers 110, 112 of the server cluster 106. Essentially, the volume unprotection procedure 500 is used by the servers 110, 112 of the server cluster 106 in order to remove a volume from the protection of the clustering software.

The volume protection procedure begins in step 502 with the clustering software receiving a volume unprotect request directed to a volume such as volume J. For example, a system administrator may generate a volume unprotect request via a user interface of the first server 110 of the server cluster 106.

In response to receiving the volume unprotect request, the clustering software of the first server 110 in step 504 informs the clustering software of each of the other servers (e.g. second server 112) of the server cluster 106 which volume (e.g. volume J) is to be unprotected. For example, the clustering software of the first server 110 may transfer a message to the clustering software of the second server 112 via the network 104 that indicates that the volume J is to be unprotected.

In step 506, the servers 110, 112 of the server cluster 106 each transfer to their respective filter driver layers 206, an unprotect request packet that is directed to the volume to be unprotected. More specifically, the clustering software of the first server 110 in a preferred embodiment opens the desired volume (e.g. volume J) by calling the CreateFile ( ) function of the Microsoft Win32 API with the path to the desired volume (e.g. VolumeHandle=CreateFile("\\.\J:", . . . ) ). As a result of calling the CreateFile ( ) function, the clustering software of the first server 110 obtains a handle to the volume desired to be protected. The clustering software then causes a custom unprotect control word (i.e. the IOCTL_DISK_LFK_UNSHARE_VOLUME control word) to be sent to the filter driver layer 206 by calling the DeviceIoControl ( ) function of the Win32 API with the handle to the volume as follows: DeviceIoControl(VolumeHandle, IOCTL_DISK_LFK_UNSHARE_VOLUME, . . . ) As a result of calling the DeviceIoControl ( ) function with the above parameters, the file system layer 202 of the operating system generates and transfers a volume unprotect IRP to the filter driver layer 206. In particular, the file system layer 202 in a preferred embodiment creates an IRP that (i) includes the custom I/O control word IOCTL_DISK_LFK_UNSHARE_VOLUME, and transfers the created IRP to the filter driver layer 206.

The filter driver layer 206 in step 508 receives and processes the volume unprotect IRP. To this end, the filter driver layer 206 determines whether the received IRP is an unprotect volume IRP. In a preferred embodiment, the filter driver layer 206 determines that the received IRP is an unprotect volume IRP if the received IRP includes the custom IOCTL_DISK_LFK_UNSHARE_VOLUME control word. If the IRP is an unprotect volume IRP, then the filter driver layer 206 determines from the unprotect protect IRP which volume is to be unprotected and stores values in the persistent storage mechanism 200 and the volume extension layer 204 that indicate that the volume is unprotected. More specifically, the filter driver layer 206 in a preferred embodiment marks the volume as unprotected by (i) storing in a registry database used to implement the persistent storage mechanism 200, a persistent volume protection flag LKSharedVolumeFlag for the volume having a value of 0, and (ii) storing in volume extension layer 204 a volume protection flag fLKSharedVolumeFlag for the volume having a value of 0.

It should be appreciated that as a result of storing the above persistent volume protection flag in the persistent storage mechanism, that the filter driver layer 206 will automatically have ownership of the associated volume upon the first server 110 being power-up. (See description of FIG. 3.)

Unlocking a Protected Volume

As indicated in conjunction with FIG. 3, the filter driver layer 206 automatically locks the servers 110, 112 of the server cluster 106 from all protected volumes during the boot up process of the servers 110,112. Accordingly, in order for a server 110, 112 to gain ownership of a protected volume, the volume must be explicitly unlocked. FIG. 6 illustrates a flowchart of a volume unlocking procedure 600 which may be executed by the servers 110, 112 of the server cluster 106 in order to provide ownership of a protected volume.

The volume unlocking procedure 600 begins in step 602 with the clustering software receiving a volume unlock request that indicates that a volume such as volume J is to be unlocked from one of the servers 110, 112 of the server cluster 106. For example, a system administrator may generate a volume unlock request via a user interface of the first server 110 of the server cluster 106.

In response to receiving the volume unlock request, the clustering software causes the individual servers 110, 112 of the server cluster 106 to communicate with each other via the network 104 in order to determine whether the volume is already unlocked (step 604). If the volume to be unlocked is already unlocked, then the clustering software in step 606 (i) generates an error message that indicates that the volume is already in use by a server 110, 112 of the server cluster 106, and (ii) terminates the volume unlock procedure 600. As a result of terminating the unlock procedure 600, the volume unlock request fails and the volume remains locked to the corresponding server 110, 112 of the server cluster 106.

However, if the clustering software determines that the volume is not already unlocked then the clustering software transfers an unlock request packet to the filter driver layer 206 of the server (e.g. the first server 110) of the server cluster to be granted ownership. For example, in order to unlock the volume J for the first server 110, the clustering software of the first server 110 in a preferred embodiment opens the volume J by calling the CreateFile ( ) function of the Microsoft Win32 API with the path "\\.\J:" (e.g. VolumeHandle=CreateFile("\\.\J:", . . . ) ). As a result of calling the CreateFile ( ) function, the clustering software of the first server 110 obtains a handle to the volume desired to be protected. The clustering software then causes a custom unlock control word (i.e. the IOCTL_DISK_LFK_UNLOCK_VOLUME control word) to be sent to the filter driver layer 206 by calling the DeviceIoControl ( ) function of the Win32 API with the handle to the volume as follows: DeviceIoControl(VolumeHandle, IOCTL_DISK_LFK_UNLOCK_VOLUME, . . . ) As a result of calling the DeviceIoControl ( ) function with the above parameters, the file system layer 202 of the operating system generates and transfers an unlock volume IRP to the filter driver layer 206. In particular, the file system layer 202 in a preferred embodiment creates an IRP that (i) includes the custom I/O control word IOCTL_DISK_LFK_UNLOCK_VOLUME, and transfers the created IRP to the filter driver layer 206.

The filter driver layer 206 in step 610 receives and processes the unlock volume IRP. To this end, the filter driver layer 206 determines whether the received IRP is an unlock volume IRP. In a preferred embodiment, the filter driver layer 206 determines that the received IRP is an unlock volume IRP if the received IRP includes the custom IOCTL_DISK_LFK_UNLOCK_VOLUME control word. If the IRP is an unlock volume IRP, then the filter driver layer 206 determines from the unlock volume IRP which volume is to be unlocked and stores a value in the volume extension layer 204 that indicate that the volume is locked. More specifically, the filter driver layer 206 in a preferred embodiment unlocks the volume by storing in the volume extension layer 204 a volume lock flag fLKLockedVolumeFlag for the volume having a value of 0.

It should be appreciated that as a result of storing the above volume lock flag fLKLockedVolumeFlag of 0 in the volume extension layer 204, that the filter driver layer 206 of the first server 110 will transfer to the additional driver layers 108 for the volume, IRPs including write IRPs that are directed to the protected volume. However, the volume extension layer 204 of the other servers (e.g. the second server 112) of the server cluster will still have a volume lock flag fLKLockedVolumeFlag of 1 stored for the volume in their respective volume extension layers 204. Accordingly, the filter driver layers 206 of the other servers (e.g. the second server 112) of the server cluster 106 will filter out write IRP's that are directed to the protected volume thereby ensuring that the other servers do not corrupt data of the protected volume.

Locking a Protected Volume

As indicated in conjunction with FIG. 6, a server 110, 112 may not unlock a protected volume unless the other servers of the server cluster 106, have the volume locked. Accordingly, clustering software and the filter driver layer 206 are operable to lock a volume that is currently unlocked. FIG. 7 illustrates a flowchart of a volume locking procedure 700 which may be executed by the servers 110, 112 of the server cluster 106 in order to lock a volume from a server of the server cluster 106.

The volume locking procedure 700 begins in step 702 with the clustering software receiving a volume lock request that indicates that a volume such as volume J is to be locked from one of the servers 110,112 of the server cluster 106. For example, a system administrator may generate a volume lock request via a user interface of the first server 110 of the server cluster 106.

In response to receiving the volume lock request, the clustering software causes the individual servers 110, 112 of the server cluster 106 to communicate with each other via the network 104 in order to determine whether the volume is already locked from the server indicated by the volume unlock request (step 704). If the volume to be locked is already locked from the indicated server 110, 112 of the server cluster 106, then the clustering software (i) generates an error message that indicates that the volume is already locked by the indicated server 110, 112 of the server cluster 106, and (ii) terminates the volume lock procedure 700.

However, if the clustering software determines that the volume is not already locked from the indicated server, then the clustering software causes a lock request packet to be transferred to the filter driver layer 206 of the server (e.g. the second server 112) of the server cluster 106 from which the volume is to be locked. For example, in order to lock the volume J from the second server 112, the clustering software of the second server 112 in a preferred embodiment opens the volume J by calling the CreateFile ( ) function of the Microsoft Win32 API with the path "\\.\J:" (e.g. VolumeHandle=CreateFile("\\.\J:", . . . ) ). As a result of calling the CreateFile ( ) function, the clustering software of the first server 110 obtains a handle to the volume desired to be protected. The clustering software then causes a custom lock control word (i.e. the IOCTL_DISK_LFK_LOCK_VOLUME control word) to be sent to the filter driver layer 206 by calling the DeviceIoControl ( ) function of the Win32 API with the handle to the volume as follows:

DeviceIoControl(VolumeHandle, IOCTL_DISK_LFK_LOCK_VOLUME, As a result of calling the DeviceIoControl ( ) function with the above parameters, the file system layer 202 of the operating system generates and transfers an lock volume IRP to the filter driver layer 206. In particular, the file system layer 202 in a preferred embodiment creates an IRP that (i) includes the custom \I/O control word IOCTL_DISK_LFK_LOCK_VOLUME, and transfers the created IRP to the filter driver layer 206.

The filter driver layer 206 in step 710 receives and processes the lock volume IRP. To this end, the filter driver layer 206 determines whether the received IRP is a lock volume IRP. In a preferred embodiment, the filter driver layer 206 determines that the received IRP is a lock volume IRP if the received IRP includes the custom IOCTL_DISK_LFK_LOCK_VOLUME control word. If the IRP is a lock volume IRP, then the filter driver layer 206 determines from the lock volume IRP which volume is to be locked and stores a value in the volume extension layer 204 that indicates that the volume is locked. More specifically, the filter driver layer 206 in a preferred embodiment locks the volume by storing in the volume extension layer 204 a volume lock flag fLKLockedVolumeFlag for the volume having a value of 1.

It should be appreciated that as a result of storing the above volume lock flag fLKLockedVolumeFlag of 1 in the volume extension layer 204, the filter driver layer 206 of the first server 110 will filter out write IRP's that are directed to the protected volume thereby ensuring that the server does not corrupt data of the protected volume.

Use of Volume Protection in a Server Cluster

In a high availability and scalable server cluster such as sever cluster 106, services are distributed amongst the servers of the server cluster. For example, a first server 110 may provide an accounting database service that requires exclusive ownership of the volume H of the shared mass storage device 108. Moreover, the second server 112 may provide an inventory database service that requires exclusive ownership of the volume J of the shared mass storage device 108.

In order to provide the first server 110 with exclusive ownership of the shared volume H and to deny the first server 110 ownership of the shared volume J, the clustering software causes the filter driver layer 206 of the first server 110 to protect the shared volumes H and J, unlocked the shared volume H, and lock the shared volume J. Similarly, in order to provide the second server 112 with exclusive ownership of the shared volume J and to deny the second server 112 ownership of the shared volume H, the clustering software causes the filter driver layer 206 of the second server 112 to protect the shared volumes H and J, unlocked the shared volume J, and lock the shared volume H.

Besides distributing services amongst the servers 110, 112 of the cluster server 106, the clustering software in a preferred embodiment is operable to move services amongst the servers 110, 112 of the server cluster in order to provide the services in a highly available fashion. For example, the clustering software may monitor the servers 110, 112 and move the services of a failed server to another operating server of the server cluster 106. A system administrator may also choose to move the services of an operating server of the server cluster 106 to other servers of the server cluster 106 so that the server may be brought offline for maintenance or hardware upgrades. By moving the services of a failed server or a server taken offline, the server cluster 106 is still operable to provide client computer systems 102 with the services.

For example, the cluster software may move the inventory database service from the second server 112 to the first server 110 so that the second server 112 may be brought offline for maintenance. In order to move the inventory database service, the cluster software stops the inventory database service on the second server 112 and causes all pending writes to the volume J to be written to the volume J. Then the cluster software causes the filter driver layer 206 of the second server 112 to lock the protected volume J from the second server 112. Once the volume J is locked from the second server 112, the clustering software causes the filter driver layer 206 of the first server 110 to unlock the volume J from the first server 110. After unlocking the volume J from the first server 110, the cluster software allocates to the first server 110 any other resources such as IP addresses required by the first server 110 in order to provide the inventory database service. Then, the clustering software starts the inventory database service on the first server 110.

In a preferred embodiment, the movement of services between servers 110, 112 of the server cluster 106 occurs without requiring any reconfiguration of client computer systems 102 or any appreciable loss of service to the client computer systems 102. From the point of view of the client computer systems 102, the moved service was, at most, momentarily unavailable between the time the service was stopped on the second server 112 and the service was started on the first server 110.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while the present invention has been described in regards to a Microsoft Windows NT operating system, features of the present invention may implemented in other operating systems environment.

What is claimed is:

1. A method of protecting volumes of a mass storage device shared by a server cluster, comprising the steps of:
   a) transferring from (i) a first file system of a first server of said server cluster to (ii) a first filter driver of said first server, a write request packet directed to a first volume of said mass storage device;
   b) determining whether said first volume is unprotected for said server cluster;
   c) determining that said first server has ownership of said first volume if step b) determines that said first volume is unprotected for said server cluster; and
   d) transferring said write request packet from said first filter driver to a lower level driver for said mass storage device only if step c) determines that said first server has ownership of said first volume.

2. A method of protecting volumes of a mass storage device shared by a server cluster, comprising the steps of:
   a) transferring from (i) a first file system of a first server of said server cluster to (ii) a first filter driver of said first server, a write request packet directed to a first volume of said mass storage device;
   b) determining whether said first volume is unlocked for said first server;
   c) determining that said first server has said ownership of said first volume if step c) determines that said first volume is unlocked for said first server; and
   d) transferring said write request packet from said first filter driver to a lower level driver for said mass storage device only if step c) determines that said first server has ownership of said first volume.

3. A method of protecting volumes of a mass storage device shared by a server cluster, comprising the steps of:
   a) transferring from (i) a first file system of a first server of said server cluster to (ii) a first filter driver of said first server, a write request packet directed to a first volume of said mass storage device;
   b) determining at said first filter driver whether said first server has ownership of said first volume;
   c) transferring said write request packet from said first filter driver to a lower level driver for said mass storage device only if step b) determines that said first server has ownership of said first volume;
   d) determining at said first filter driver whether said first volume is protected for said server cluster;
   e) locking said first volume from said first server in response to step d) determining that said first volume is protected for said server cluster; and
   f) unlocking said first volume for said first server in response to said first filter driver receiving an unlock request packet directed to said first volume,
   wherein step b) comprises the steps of b1) determining whether said first volume is unlocked for said first server, and b2) determining that said first server has ownership of said first volume if step b1) determines that said first volume is unlocked for said first server.

4. A method of protecting volumes of a mass storage device shared by a server cluster, comprising the steps of:
   a) transferring from (i) a first file system of a first server of said server cluster to (ii) a first filter driver of said first server, a write request packet directed to a first volume of said mass storage device;
   b) determining at said first filter driver whether said first server has ownership of said first volume;
   c) transferring said write request packet from said first filter driver to a lower level driver for said mass storage device only if step b) determines that said first server has ownership of said first volume;
   d) generating a write protected packet from said write request packet if step b) determines that said first server does not have ownership of said first volume; and
   e) transferring said write protected packet from said first filter driver to said first file system in response to step d) generating said write protected packet.

5. A method of protecting volumes of a mass storage device shared by a server cluster, comprising the steps of:
   a) transferring from (i) a first file system of a first server of said server cluster to (ii) a first filter driver of said first server, a write request packet directed to a first volume of said mass storage device;
   b) determining at said first filter driver whether said first server has ownership of said first volume; and
   c) transferring said write request packet from said first filter driver to a lower level driver for said mass storage device only if step b) determines that said first server has ownership of said first volume;
   wherein step b) comprises the steps of:
   b1) determining whether said first volume is locked from said first server, and
   b2) determining that said first server does not have ownership of said first volume if step b1) determines that said first volume is locked from said first server.

6. A method of protecting volumes of a mass storage device shared by a server cluster, comprising the steps of:

a) transferring from (i) a first file system of a first server of said server cluster to (ii) a first filter driver of said first server, a write request packet directed to a first volume of said mass storage device;

b) determining at said first filter driver whether said first server has ownership of said first volume; and c) transferring said write request packet from said first filter driver to a lower level driver for said mass storage device only if step b) determines that said first server has ownership of said first volume;

d) determining at said first filter driver whether said first volume is protected for said server cluster; and e) locking said first volume from said first server in response to step d) determining that said first volume is protected for said server cluster, wherein step b) comprises the steps of b1) determining whether said first volume is unlocked for said first server, and b2) determining that said first server does not have ownership of said first volume if step b1) determines that said first volume is locked for said first server.

7. A method of protecting volumes of a mass storage device shared by a server cluster, comprising the steps of:

a) transferring from (i) a first file system of a first server of said server cluster to (ii) a first filter driver of said first server, a write request packet directed to a first volume of said mass storage device;

b) determining at said first filter driver whether said first server has ownership of said first volume;

c) transferring said write request packet from said first filter driver to a lower level driver for said mass storage device only if step b) determines that said first server has ownership of said first volume;

d) protecting said first volume by storing a separate persistent protection value for each server of said server cluster that indicates said first volume is protected for said server cluster;

e) determining for each server of said server cluster whether said separate persistent protection value indicates that said first volume is protected for said server cluster;

f) setting a separate lock value for each server of said server cluster that indicates said first volume is locked from said each server in response to step e) determining said separate persistent protection value for said each server indicates said first volume is protected for said server cluster; and g) updating said lock value for said first server to indicate that said first volume is unlocked for said first server in response to said first filter driver receiving an unlock request packet directed to said first volume, wherein step b) comprises the step of determining that said first server has ownership of said first volume based upon said lock value for said first server.

8. A filter driver for protecting volumes of a mass storage device shared by a server cluster, comprising a plurality of instructions which when executed by a first server of said server cluster causes said first server to:

process a write request packet (i) directed to a first volume of said mass storage device, and (ii) received from a first file system of said first server;

determine whether said first volume is unprotected for said server cluster;

determine that said first server has ownership of said first volume if said first server determines that said first volume is unprotected from said server; and transfer said write request packet to a lower level driver for said mass storage device only if said first server determines that said first server has ownership of said first volume.

9. A filter driver for protecting volumes of a mass storage device shared by a server cluster, comprising a plurality of instructions which when executed by a first server of said server cluster causes said first server to:

process a write request packet (i) directed to a first volume of said mass storage device, and (ii) received from a first file system of said first server;

determine whether said first volume is unlocked for said first server;

determine that said first server has ownership of said first volume if said first server determines that said first volume is unlocked for said first server; and transfer said write request packet to a lower level driver for said mass storage device only if said first server determines that said first server has ownership of said first volume.

10. A filter driver for protecting volumes of a mass storage device shared by a server cluster, comprising a plurality of instructions which when executed by a first server of said server cluster causes said first server to:

process a write request packet (i) directed to a first volume of said mass storage device, and (ii) received from a first file system of said first server;

determine in response to processing said write request packet whether said first server has ownership of said first volume; and transfer said write request packet to a lower level driver for said mass storage device only if said first server determines that said first server has ownership of said first volume;

wherein said plurality of instructions when executed by said processor further cause said processor to:

determine whether said first volume is protected for said server cluster;

lock said first volume from said first server in response to determining that said first volume is protected for said server cluster;

receive an unlock request packet received from said first file system and directed to said first volume;

unlock said first volume for said first server in response to receiving said unlock request packet; and determine that said first server has ownership of said first volume if said first server determines that (i) said first volume is unlocked for said first server.

11. A filter driver for protecting volumes of a mass storage device shared by a server cluster, comprising a plurality of instructions which when executed by a first server of said server cluster causes said first server to:

process a write request packet (i) directed to a first volume of said mass storage device, and (ii) received from a first file system of said first server;

determine in response to processing said write request packet whether said first server has ownership of said first volume; and transfer said write request packet to a lower level driver for said mass storage device only if said first server determines that said first server has ownership of said first volume;

generate a write protected packet from said write request packet if said first server determines that said first server does not have ownership of said first volume; and transfer said write protected packet to said first file system.

12. A filter driver for protecting volumes of a mass storage device shared by a server cluster, comprising a plurality of instructions which when executed by a first server of said server cluster causes said first server to:

process a write request packet (i) directed to a first volume of said mass storage device, and (ii) received from a first file system of said first server;

determine in response to processing said write request packet whether said first server has ownership of said first volume; and transfer said write request packet to a lower level driver for said mass storage device only if said first server determines that said first server has ownership of said first volume;

wherein said plurality of instructions when executed by said first server further cause said first server to:

determine whether said first volume is locked for said first server; and determine that said first server does not have ownership of said first volume if said first server determines that said first volume is locked for said first server.

13. A filter driver for protecting volumes of a mass storage device shared by a server cluster, comprising a plurality of instructions which when executed by a first server of said server cluster causes said first server to:

process a write request packet (i) directed to a first volume of said mass storage device, and (ii) received from a first file system of said first server;

determine in response to processing said write request packet whether said first server has ownership of said first volume; and transfer said write request packet to a lower level driver for said mass storage device only if said first server determines that said first server has ownership of said first volume;

wherein said plurality of instructions when executed by said first server further cause said first server to:

determine whether said first volume is protected for said server cluster;

lock said first volume from said first server in response to determining that said first volume is protected for said server cluster;

determine that said first server does not have ownership of said first volume if said first server determines that said first volume is locked for said first server.

14. A filter driver for protecting volumes of a mass storage device shared by a server cluster, comprising a plurality of instructions which when executed by a first server of said server cluster causes said first server to:

process a write request packet (i) directed to a first volume of said mass storage device, and (ii) received from a first file system of said first server;

determine in response to processing said write request packet whether said first server has ownership of said first volume; and transfer said write request packet to a lower level driver for said mass storage device only if said first server determines that said first server has ownership of said first volume;

wherein said plurality of instructions when executed by said first server further cause said first server to:

determine whether a persistent protection value of said first server indicates that said first volume is protected for said server cluster;

set a lock value for said first server that indicates that said first volume is locked from said first server if said first server determines that said persistent protection value indicates that said first volume is protected for said server cluster;

update said lock value for said first server to indicate that said first volume is unlocked in response to receiving a unlock request packet directed to said first volume; and determine that said first server has ownership of said first volume based upon said lock value for said first server indicating that said first volume is unlocked for said first server.

15. A server cluster, comprising:

a mass storage device comprising a plurality of volumes;

a first server coupled to said mass storage device, said first server comprising a first file system, a first filter driver, and at least one first lower level driver for said mass storage device, wherein said first filter driver is operable to:
 a) process a first write request packet received from said first file system that is directed to a first volume of said plurality of volumes,
 b) determine in response to processing said first write request packet whether said first server has ownership of said first volume, and
 c) transfer said first write request packet to said at least one lower level driver only if said first server has ownership of said first volume;

a second server coupled to said mass storage device, said second server comprising a second file system, a second filter driver, and at least one second lower level driver for said mass storage device, wherein said second filter driver is operable to:
 a) process a second write request packet received from said second file system that is directed to said first volume of said plurality of volumes;
 b) determine in response to processing said second write request packet whether said second server has ownership of said second volume; and
 c) transfer said second write request packet to said at least one second lower level driver only if said second server has ownership of said first volume; and a cluster manager operable to (i) cause said first server to store a first persistent protection value that indicates that said first volume is protected, and (ii) cause said second server to store a second persistent protection value that indicates that said first volume is protected, (iii) cause said first file system to transfer to said first filter driver, an unlock request packet directed to said first volume, wherein said first filter driver is further operable to d) determine whether said first persistent protection value indicates that said first volume is protected, e) set a first lock value for said first server to indicate that said first volume is locked in response to said first persistent protection value indicating that said first volume is protected, f) update said first lock value to indicate that said first volume is unlocked in response to receiving said unlock request packet, g) determine that said first server has ownership of said first volume based upon said lock value for said first server indicating that said first volume is unlocked, and said second filter driver is further operable to d) determine whether said second persistent protection value indicates that said first volume is protected, e) set a second lock value for said second server to indicate that said first volume is locked from said second server in response to said second persistent protection value indicating that said first volume is protected, f) determine that said second server does not have ownership of said first volume based upon said second lock value for said second server indicating that said first volume is locked from second server.

16. The server cluster of claim 15, wherein:

said cluster manager comprises software routines executed by said first server and said second server.

17. A server cluster, comprising:

a mass storage device comprising a plurality of volumes;

a first server coupled to said mass storage device, said first server comprising a first file system, a first filter driver, and at least one first lower level driver for said mass storage device, wherein said first filter driver is operable to:
   a) process a first write request packet received from said first file system that is directed to a first volume of said plurality of volumes,
   b) determine in response to processing said first write request packet whether said first server has ownership of said first volume,
   c) transfer said first write request packet to said at least one lower level driver only if said first server has ownership of said first volume;
   d) generate a write protected packet from said write request packet if said first server does not have ownership of said first volume; and
   e) transfer said write protected packet from said first filter driver to said first file system in response to generating said write protected packet; and a second server coupled to said mass storage device, said second server comprising a second file system, a second filter driver, and at least one second lower level driver for said mass storage device, wherein said second filter driver is operable to:
   a) process a second write request packet received from said second file system that is directed to said first volume of said plurality of volumes;
   b) determine in response to processing said second write request packet whether said second server has ownership of said second volume; and
   c) transfer said second write request packet to said at least one second lower level driver only if said second server has ownership of said first volume.

* * * * *